US009160767B2

(12) United States Patent
Keum et al.

(10) Patent No.: US 9,160,767 B2
(45) Date of Patent: Oct. 13, 2015

(54) SYSTEM AND METHOD FOR DEVICE MANAGEMENT SECURITY OF TRAP MANAGEMENT OBJECT

(75) Inventors: Ji-Eun Keum, Suwon-si (KR); Hae-Young Jun, Anyang-si (KR); Wuk Kim, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 16 days.

(21) Appl. No.: 12/594,755

(22) PCT Filed: Apr. 3, 2008

(86) PCT No.: PCT/KR2008/001875
§ 371 (c)(1),
(2), (4) Date: Oct. 5, 2009

(87) PCT Pub. No.: WO2008/123682
PCT Pub. Date: Oct. 16, 2008

(65) Prior Publication Data
US 2010/0121967 A1 May 13, 2010

(30) Foreign Application Priority Data
Apr. 6, 2007 (KR) .................. 10-2007-0033941

(51) Int. Cl.
*G06F 15/16* (2006.01)
*H04L 29/06* (2006.01)
(Continued)

(52) U.S. Cl.
CPC ............. *H04L 63/20* (2013.01); *G06F 21/6272* (2013.01); *H04L 41/28* (2013.01); *H04L 63/10* (2013.01); *G06F 2221/2115* (2013.01)

(58) Field of Classification Search
CPC .. H04L 41/0213; H04L 41/0233; H04L 63/10
USPC ............ 709/223, 224, 227, 229; 726/2–6, 21
See application file for complete search history.

(56) References Cited

U.S. PATENT DOCUMENTS 7,113,995 B1 * 9/2006 Beukema et al. ............. 709/229
7,269,821 B2 * 9/2007 Sahinoja et al. ............. 717/106
(Continued)

FOREIGN PATENT DOCUMENTS

EP 1473873 A2 11/2004
EP 1513317 A2 3/2005
(Continued)

*Primary Examiner* — Michael Won
*Assistant Examiner* — Nicholas Celani
(74) *Attorney, Agent, or Firm* — The Farrell Law Firm, P.C.

(57) ABSTRACT

The present invention relates to a system and method for device management security, and more particularly to a system and method for device management security of a trap management object (Trap MO), which can prevent a non-authorized device management server from indirectly controlling device management of a mobile terminal through use of the Trap MO defined in Open Mobile Alliance Device Management (OMA DM). To this end, when a DM client receives a request to register a notification target MO as a recipient node registration from a DM server, the DM client determines if the DM server has authority for both addition and execution and allows only an authorized DM server to register a recipient node in the Trap MO, so that only a DM server having authority for execution of an MO can execute the MO and control the device management of a mobile terminal. Accordingly, it is possible to enhance device management security of the mobile terminal against non-authorized DM servers.

17 Claims, 5 Drawing Sheets

(51) Int. Cl.
*G06F 21/62* (2013.01)
*H04L 12/24* (2006.01)

(56) References Cited

U.S. PATENT DOCUMENTS

| | | | |
|---|---|---|---|
| 2003/0204640 A1* | 10/2003 | Sahinoja et al. | 709/311 |
| 2004/0203686 A1 | 10/2004 | Bahr | |
| 2006/0150256 A1* | 7/2006 | Fanton et al. | 726/27 |
| 2007/0259633 A1* | 11/2007 | Rao | 455/130 |
| 2008/0040452 A1* | 2/2008 | Rao et al. | 709/219 |
| 2008/0040797 A1* | 2/2008 | Schwartz et al. | 726/19 |
| 2008/0057947 A1* | 3/2008 | Marolia et al. | 455/425 |
| 2008/0104207 A1* | 5/2008 | Pulkkinen et al. | 709/220 |
| 2008/0163262 A1* | 7/2008 | He | 719/321 |

FOREIGN PATENT DOCUMENTS

| | | |
|---|---|---|
| EP | 1515571 A2 | 3/2005 |
| KR | 0641831 B1 | 10/2006 |

\* cited by examiner

SYSTEM AND METHOD FOR DEVICE MANAGEMENT SECURITY OF TRAP MANAGEMENT OBJECT

TECHNICAL FIELD

The present invention relates to a system and method for device management security, and more particularly to a system and method for device management security of a trap management object (Trap MO), which can prevent a non-authorized device management server from indirectly controlling device management of a mobile terminal through use of the Trap MO defined in Open Mobile Alliance Device Management (OMA DM).

BACKGROUND ART

The Open Mobile Alliance (OMA), a mobile standard organization, includes a plurality of working groups according to technologies, one of which is a device management (DM) working group. The DM working group is in the process of establishing a service standard using a DM protocol between a device management server (DM server) and a device management client (DM client) in order to provide optimum service to mobile terminals in a wireless environment. That is, the DM working group is in the process of developing a device management standard by which a wireless operator or service provider can manage firmware, software, parameters, schedules, etc. of a mobile terminal while wirelessly communicating with the mobile terminal.

A DM server and a DM client have data to be shared between them, wherein the data is called a management object (MO). The MO defines parameters which must be shared between a DM server and a DM client, in a tree-type data structure. There are various MOs, one of which is a Trap MO.

When a specific event or trap is issued from a DM client, the Trap MO functions to inform such an event issue to a DM server or to other MOs in the mobile terminal. Accordingly, when a specific event is issued, the DM server or other MOs in the mobile terminal are notified of the event issue through the Trap MO, and perform operations established in themselves.

The Trap MO includes either an ID of the DM server or an MO identifier (hereinafter, referred to as an "MO URI") of a different MO, which is to be notified of the event issue, wherein the operation of registering a DM server ID or an MO URI in the Trap MO may be performed by the DM server.

FIG. 1 is a flowchart illustrating a conventional procedure for registering a notification target MO in a Trap MO of a DM client.

As shown in FIG. 1, when a DM server 100 requests a DM client 200 to register a notification target MO (hereinafter, referred to as an "MO1") in step 1, the DM client 200 determines if the DM server 100, which has made the request, has registration request authority in step 2. When the DM server 100 has no registration request authority, the DM client 200 transmits a registration error message to the DM server 100 in step 4. When the DM server 100 has registration request authority, the DM client 200 registers an MO1 URI in a Trap MO in step 3, and transmits a registration confirmation message to the DM server 100 in step 5.

DISCLOSURE

Technical Problem

As described above, when a DM server has registration request authority, the DM server can appoint an MO to be notified of an event issue through the aforementioned registration procedure, without permission. Therefore, although the DM server has no execution authority for multiple MOs included in the mobile terminal, the DM server can indirectly execute the multiple MOs through the Trap MO. That is, the Trap MO has a weakness in security in that it allows a non-authorized DM server to control the device management of the mobile terminal. For example, if an MO to be notified includes a command to eliminate an important file system of a device, there may be a danger that the non-authorized DM server causes serious errors in the mobile terminal by eliminating the file system using the Trap MO.

Therefore, the present invention has been made in view of the above-mentioned problem, and it is an object of the present invention to provide a system and method for device management security of a Trap MO, which can prevent a DM server, which has no authority for an MO of a mobile terminal, from indirectly executing the MO through a Trap MO.

Technical Solution

In order to achieve the above-mentioned object, there is provided a system for device management security of trap management object (Trap MO), the system including: a device management (DM) server for transmitting an addition command to add a recipient node to the Trap MO; and a DM client for determining if the DM server has authority to make the addition command by checking the Trap MO in the DM client when the DM client has received the addition command, determining if the DM server has authority to make an execution command by checking a notification target MO when the DM server has authority to make the addition command, and registering the recipient node in the Trap MO when the DM server has authority to make the execution command.

Also, according to another aspect of the present invention, there is provided a device management (DM) client including: a DM message transmission/reception block for receiving an addition command to add a recipient node to a trap management object (Trap MO) from a DM server; an MO storage block for storing the Trap MO and a plurality of management objects (MOs) which are notification targets; and a security management block for determining, when receiving the addition command, if the DM server has authority to make the addition command by checking the Trap MO, determining if the DM server has authority to make an execution command by checking the notification target MO, and registering the notification target MO as a recipient node in the Trap MO when the DM server has the authority to make the addition command and execution command.

In addition, according to still another aspect of the present invention, there is provided a method for device management security of a trap management object (Trap MO), the method including the steps of: receiving, by a device management (DM) client, an addition command to add a recipient node to the Trap MO from a DM server; determining, by the DM client, if the DM server has authority to make the addition command by checking the Trap MO; determining if the DM server has authority to make an execution command by checking a notification target MO when the DM server has authority to make the addition command; and registering a recipient node in the Trap MO when the DM server has authority to make the execution command.

Advantageous Effects

As described above, according to the present invention, when a DM client receives a request for registration of a recipient node from a DM server, the DM client determines if the DM server has authority for both addition and execution before registering the recipient node, so that it is possible to allow only an authorized DM server to control device management of a mobile terminal. Accordingly, it is possible to enhance device management security of the mobile terminal against non-authorized DM servers.

BEST MODE

Mode for Invention

Hereinafter, exemplary embodiments of the present invention will be described in detail with reference to the accompanying drawings.

Figure 1:
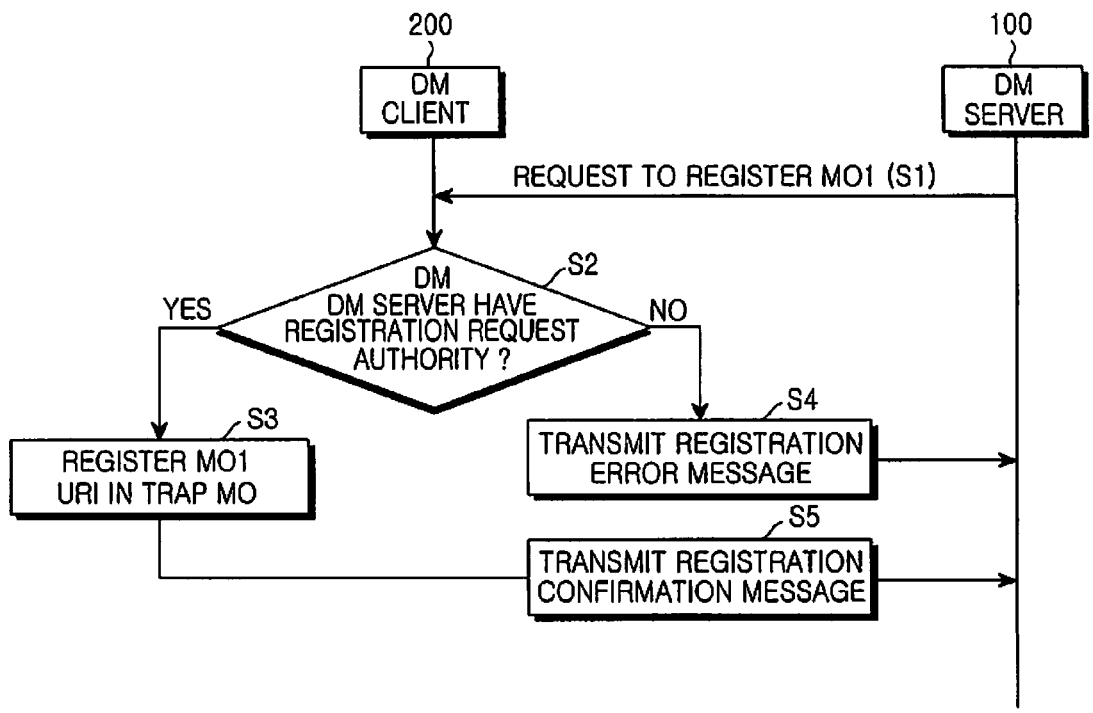
FIG. 1 is a flowchart illustrating a conventional method for establishing a notification target MO in a Trap MO of a DM client.
Figure 2:
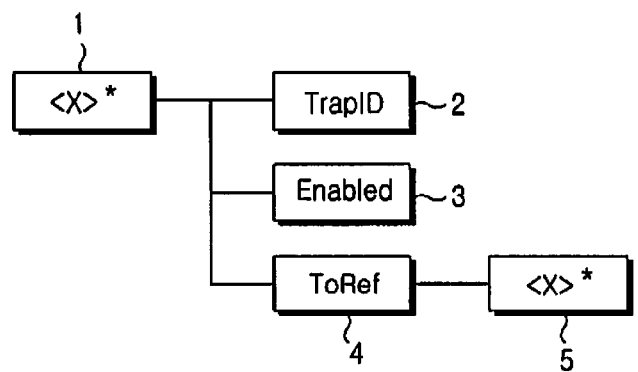
FIG. 2 is a view illustrating the structure of a Trap MO used in the present invention.

FIG. 2 is a view illustrating a structure of a Trap MO used in the present invention.

As shown in FIG. 2, a Trap MO includes a TrapID node, an Enabled node, and a ToRef node in a tree form. The TrapID node 2 represents a type of an event managed by the Trap MO, and has an ID value registered in an open mobile naming authority (OMNA) according to each event. The Enabled node 3 has a value representing whether or not to monitor an event represented by a TrapID, and the ToRef node 4 may have a plurality of DM server IDs or MO URIs of a mobile terminal, to which notification is to be sent when a corresponding event is issued, as lower nodes thereof. Here, "<X>*" represents that there may be a plurality of nodes, wherein "<X>*" indicated by reference numeral 1 represents that the Trap MO includes a plurality of Trap nodes (e.g. Trap1, Trap2, Trap3, etc.), and "<X>*" indicated by reference numeral 5 represents that the ToRef node 4 has a plurality of lower nodes. The lower nodes of the ToRef node 4 include a DM server ID or an MO URI, to which notification is to be sent. According to an exemplary embodiment of the present invention, a node included in "<X>*" indicated by reference numeral 5 will be called a recipient node.

Figure 3:
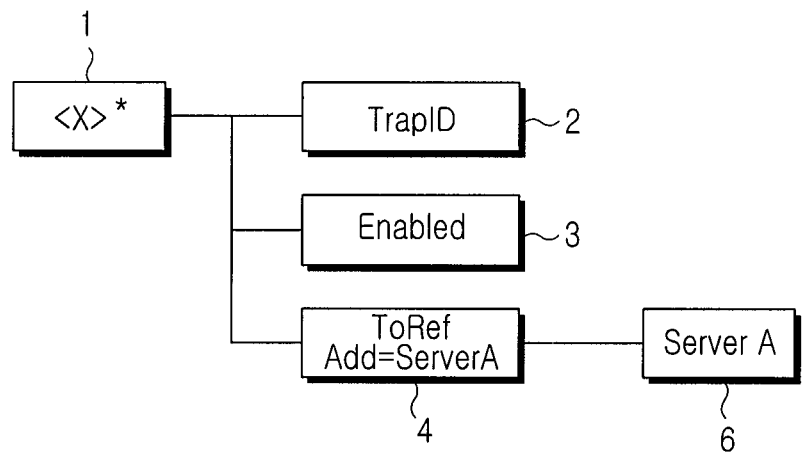
FIG. 3 is a view illustrating the structure of a Trap MO created by a DM server.

FIG. 3 illustrates a case where a DM server ID is registered as a recipient node in the ToRef node 4 of the Trap MO. As shown in FIG. 3, an ID of DM server A has been registered in a recipient node 6. The Trap MO of FIG. 3 is created by a DM server 100 and is transferred to a DM client 200.

Figure 4:
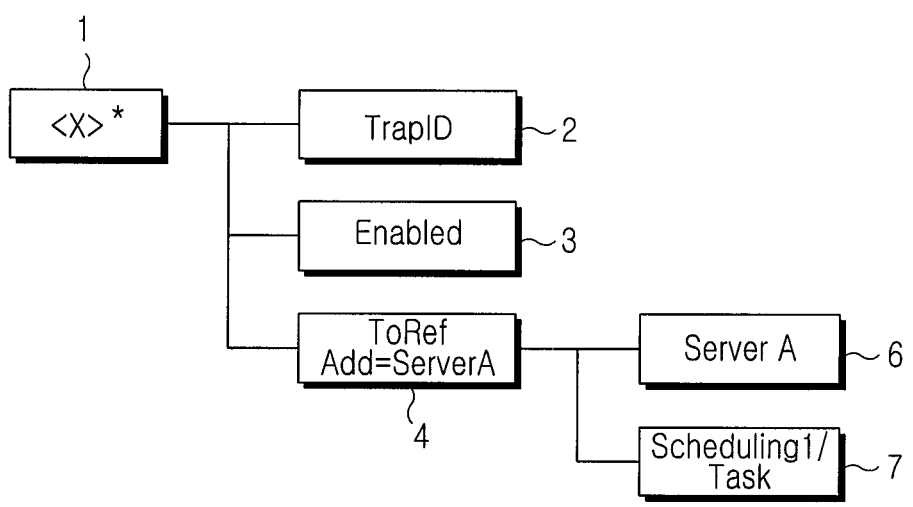
FIG. 4 is a view illustrating the structure of a Trap MO in which a notification target MO has been registered.

FIG. 4 illustrates a case where two recipient nodes 6 and 7 are included in the ToRef node 4 of the Trap MO. As shown in FIG. 4, a first recipient node 6 includes an ID of DM server A, and a second recipient node 7 includes a URI of a scheduling MO. The scheduling MO is constituted by a condition and a task performed according to the condition, so that the task is performed when the predetermined condition is satisfied. The condition for the scheduling MO includes a time or an event, wherein, when an issue of an event is informed from the Trap MO, a task corresponding to the issued event is performed.

Figure 7:
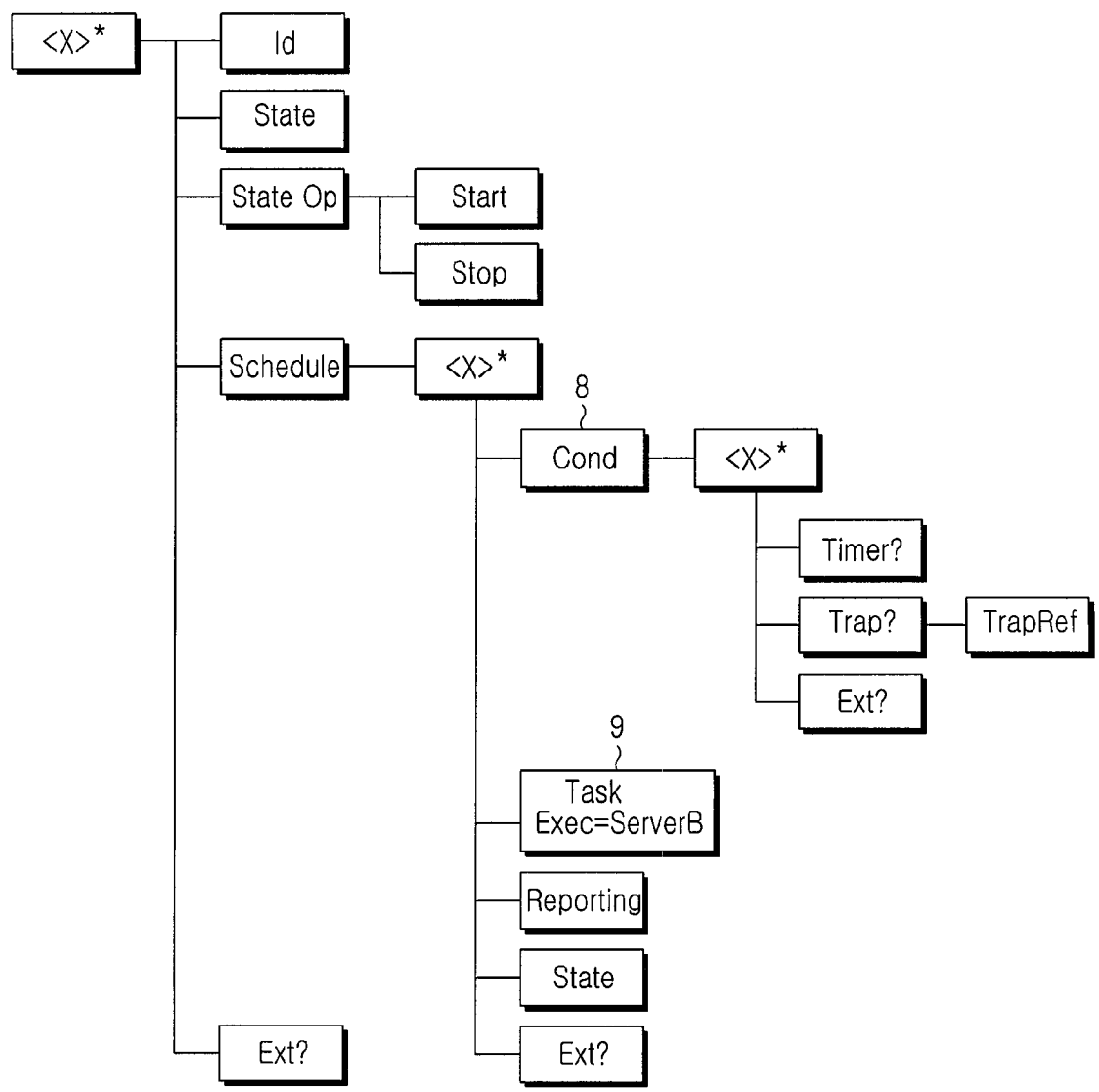
FIG. 7 is a view illustrating the structure of a scheduling MO which is a notification target.

The structure of the scheduling MO is shown in FIG. 7. Referring to FIG. 7, it can be understood that the scheduling MO also is constituted by a plurality of nodes in a tree form. Among the nodes constituting the scheduling MO, a Cond node 8 includes a time node "Time?", an event node "Trap?", etc. as lower nodes, and a Task node 9 includes a specific task command. A description of other nodes will be omitted because it may make the subject matter of the present invention rather unclear.

Figure 5:
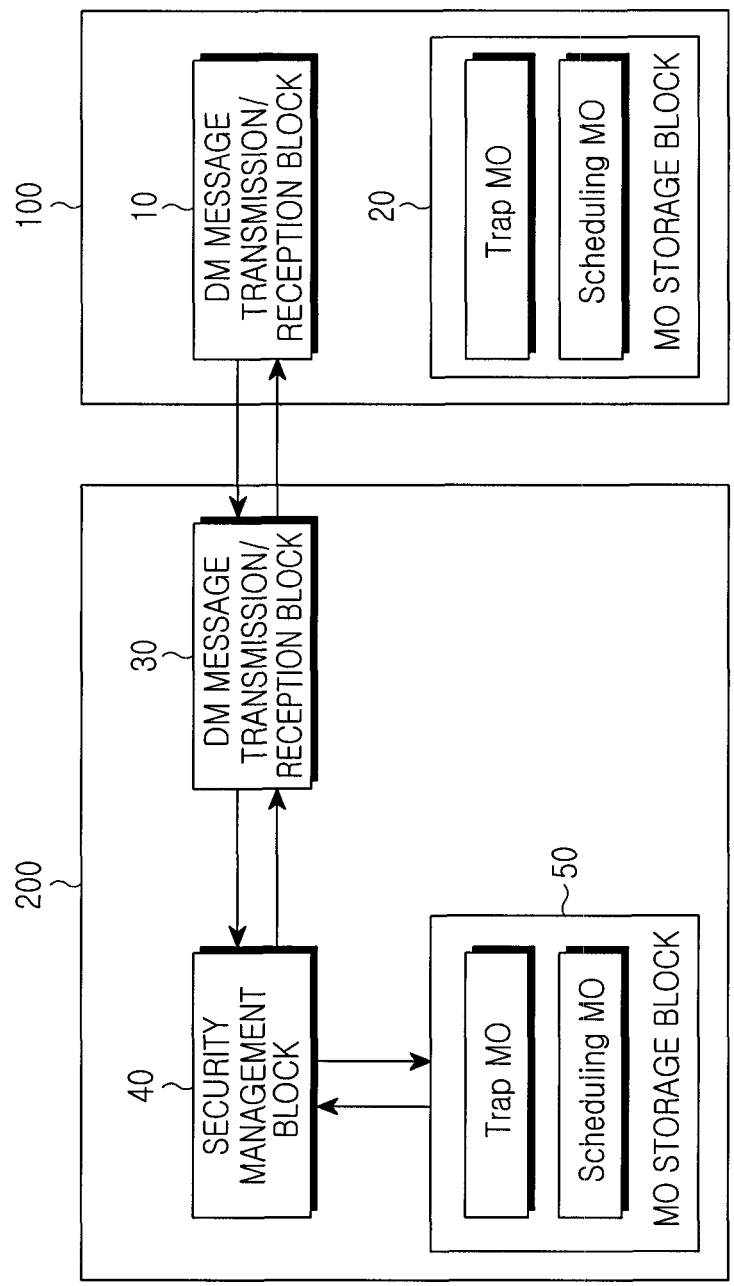
FIG. 5 is a block diagram illustrating the configuration of a system for device management security according to an exemplary embodiment of the present invention.

FIG. 5 is a block diagram illustrating the configuration of a system for device management security according to an exemplary embodiment of the present invention. A general device management system includes a DM server 100 and a DM client 200, which transmit/receive signals and data by using a DM protocol.

As shown in FIG. 5, the DM client 200 includes a DM message transmission/reception block 30 for transmitting/receiving DM messages through a DM protocol, a security management block 40 for determining if the DM server 200 has authority and adding a recipient node to a Trap MO, and an MO storage block 50 for storing a Trap MO and other MOs.

The DM server 100 includes a DM message transmission/reception block 10 for transmitting/receiving DM messages through a DM protocol, and an MO storage block 20 for storing a Trap MO and other MOs. Generally, since an MO is created by the DM server 100 and is transferred to the DM client 200, the DM server 100 and DM client 200 have the same MO.

Figure 6:
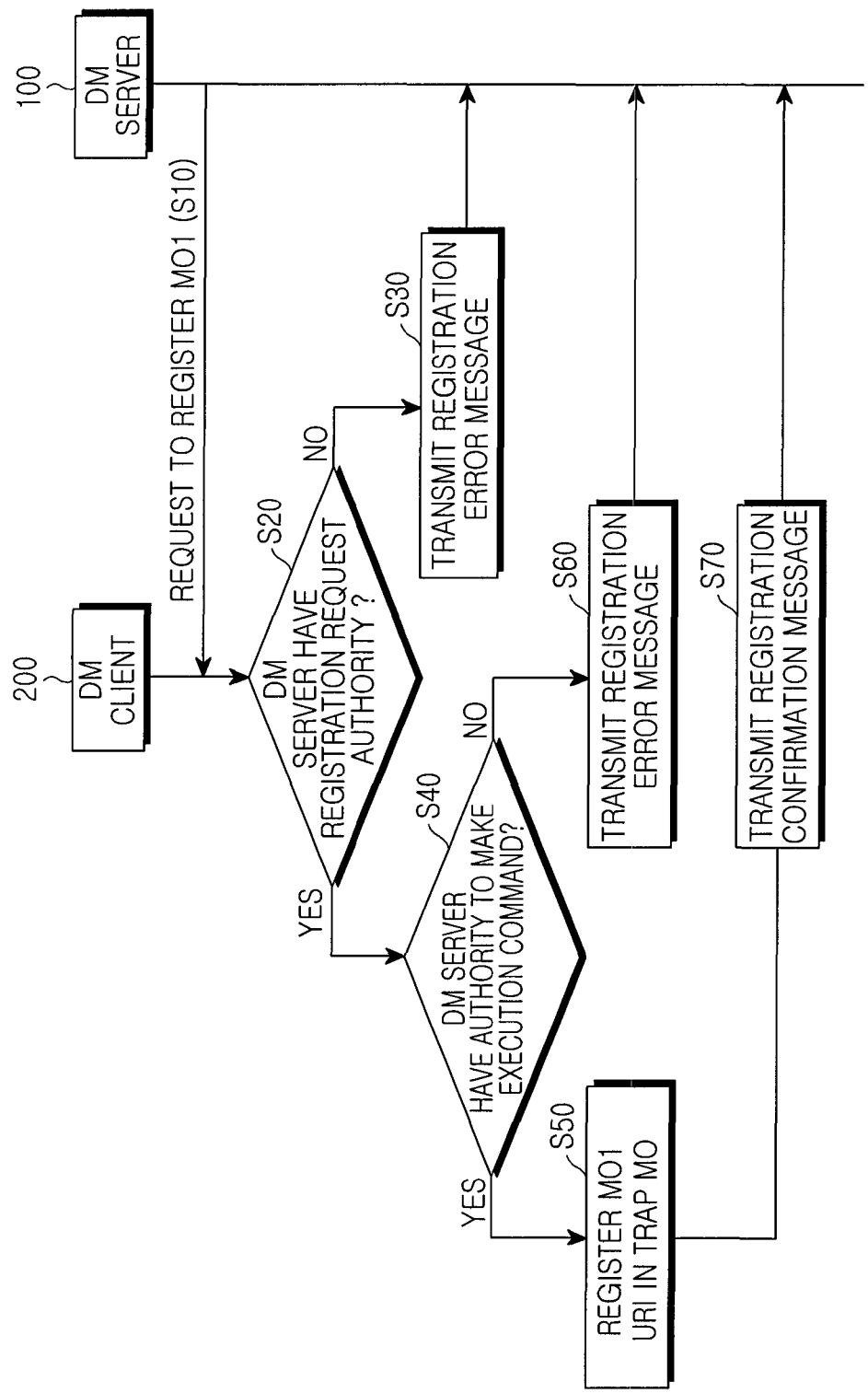
FIG. 6 is a flowchart illustrating a method for device management security according to an exemplary embodiment of the present invention.

A procedure of adding a recipient node to a Trap MO will now be described in detail with reference to FIGS. 5 and 6. According to an exemplary embodiment of the present invention, a procedure of adding an ID of a DM server or a URI of an MO, to which notification of an event issue is to be sent, to the Trap MO is called a registration, so that the addition may be a part of a registration process.

First, the DM server 100 creates a Trap MO shown in FIG. 3, stores the Trap MO in the MO storage block 20, and transmits the Trap MO to the DM client 200 through the DM message transmission/reception block 10. The DM client 200 receives the Trap MO through the DM message transmission/reception block 30, and stores the received Trap MO in the MO storage block 50. While the exemplary embodiment of the present invention is described about the case where the Trap MO of FIG. 3 is created by the DM server 100 and is transferred to the DM client 200, the present invention may be implemented in such a manner that a Trap MO having no recipient node is transferred to the DM client 200, and then a DM server ID is registered in the Trap MO according to a registration request of the DM server 100.

Also, the DM server 100 and the DM client 200 may store a plurality of mutually different MOs according to service to be provided in their own MO storage blocks 20 and 50, wherein the embodiment of the present invention will be described about a case where the DM server 100 and the DM client 200 have a scheduling MO. That is, it is assumed that the scheduling MO has been transferred from the DM server 100 as an MO to which a Trap MO is to be sent, and has been stored in the DM client 200 in advance, before the DM client 200 receives the Trap MO as described above.

In this state, the DM server 100 requests the DM client 200 to register an MO, to which notification of an event issue is to be sent, through the DM message transmission/reception block 10 in step 10. The request for the registration is performed through an ADD command using a DM protocol. That is, the DM server 100 transmits a command of "ADD Trap1/ToRef/MO1" to the DM client 200. The command of "ADD Trap1/ToRef/MO1" is a command for adding an MO1 which is below a ToRef node of a Trap1 node among a plurality of nodes (including Trap1, Trap2, Trap3, etc.) of the Trap MO, as a recipient node. According to an exemplary embodiment of the present invention, the MO1 may be Scheduling 1 of the scheduling MO.

When receiving the ADD command through the DM message transmission/reception block 30, the DM client 200 transfers the ADD command to the security management block 40. The security management block 40 determines whether an object requested to be registered is a DM server ID or an MO URI, checks a Trap MO, and determines if the DM server 100 has authority to make the ADD command in step 20. When the object requested to be registered is a DM server ID, similarly in the prior art, the DM client 200 registers the DM server ID as a recipient node if the DM server 100 has the authority to make the ADD command, and transmits a registration error message to the DM server 100 if the DM server 100 has no authority to make the ADD command. In contrast, when the object requested to be registered is an MO URI, the procedure according to the present invention further performs a determination step (step 40), differently from the conventional procedure of directly registering the MO URI in the Trap MO when the DM server 100 has the authority to make the ADD command.

An MO is configured in a tree structure including a plurality of nodes, wherein each node has access control list (ACL) information that represents a DM server having authority to control the corresponding node. For example, "Add=ServerA" included in the ToRef node 4, shown in FIGS. 3 and 4, corresponds to ACL information, and it represents that server A has authority to make the ADD command. Also, "Exec=ServerB" included in the Task node 9 of the scheduling MO, shown in FIG. 7, represents that server B has authority to make an execution command.

The authority determination method will now be described in detail with reference to steps 20 and 40. Here, it is assumed that an ID of the DM server 100 is "A." When the DM client 200 receives an ADD command to add an MO1 URI from the DM server 100, the DM client 200 checks ACL information included in the ToRef node 4 of the Trap MO in step 20. When the ACL information corresponds to "Add=ServerA" as a result of the determination of ACL information in the ToRef node 4, the DM client 200 determines that the DM server 100 has authority to make the ADD command, and proceeds to step 40. In contrast, if it is determined that the DM server 100 has no authority to make the ADD command as a result of the determination of ACL information in the ToRef node 4, for example, if the ACL information corresponds to "Add=ServerB," the DM client 200 transmits a registration error message to the DM server 100 in step 30.

When the DM server 100 has the authority to make the ADD command, the DM client 200 checks ACL information included in nodes of the MO1 in step 40. That is, when "Exec=ServerB" is confirmed as a result of checking the ACL of the Scheduling1 Task node 9 of the scheduling MO, shown in FIG. 7, the DM client 200 determines that the DM server 100 has no authority to make the execution command, and transmits a registration error message to the DM server 100 in step 60. In contrast, when "Exec=ServerA" or "Exec=ServerA+ServerB" is confirmed as a result of checking the ACL of the Scheduling1 Task node 9, it represents that the DM server 100 has the authority to make the execution command. Therefore, in this case, the DM client 200 registers an MO1 URI, i.e. a Scheduling1/Task URI, as a recipient node in the Trap MO in step 50, and transmits a registration confirmation message to the DM server 100 in step 70.

As described above, since only an authorized DM server 100 can register a recipient node in the Trap MO, it is possible to remove the weakness in security in the prior art, which allows a non-authorized DM server 100 to indirectly perform a device management through the Trap MO by allowing a non-authorized DM server 100 to register a recipient node in the Trap MO, and allowing an MO notified from the non-authorized DM server 100 to perform a corresponding operation.

While the above description has been made regarding the case where the DM server 100 creates a Trap MO as shown in FIG. 3, transfers the Trap MO to the DM client 200, and registers a recipient node, the present invention may be implemented in such a manner that the DM server 100 creates a Trap MO having no registered recipient node, as shown in FIG. 2, transfers the Trap MO to the DM client 200, registers a DM server ID through a registration request, and registers an MO URI. The registration of the DM server ID or MO URI may be performed immediately after the Trap MO has been transferred to the DM client 200, or may be performed some time after the Trap MO has been transferred if the DM server 100 has a task to be performed.

INDUSTRIAL APPLICABILITY

The present invention is not limited to the aforementioned embodiments, and those skilled in the art will appreciate that various modifications, additions and substitutions are possible, without departing from the scope and spirit of the invention as disclosed in the accompanying claims. Therefore, while the embodiments of the present invention has been described about a scheduling MO as an example of an object to be notified, the present invention may be applied to all MOs having an execution command among MOs defined according to services in the OMA.

The invention claimed is:

1. A Device Management (DM) client device, comprising:
 a computer processor;
 a memory for storing processor-executable instructions which, when executed by the computer processor, implement a DM message transmission/reception block, a Management Object (MO) storage block and a security management block;
 the DM message transmission/reception block for receiving an addition command to add a recipient node to a Trap Management Object (Trap MO);
 the MO storage block for storing the Trap MO including authority information which represents that a DM server device has authority to make the addition command and a plurality of MOs which include a notification target MO; and
 the security management block for determining, when receiving the addition command, if the DM server device has authority to make the addition command by checking the authority information of the Trap MO via a lookup on a list, determining if the DM server device has authority to make an execution command by checking, via the lookup on the list, the notification target MO requested to be registered, and registering the notification target MO as the recipient node in the Trap MO when the DM server device has the authority to make the addition command and execution command.

2. A method for device management security of a Trap Management Object (Trap MO) in a Device Management (DM) client device, the method comprising the steps of:
receiving the Trap MO including authority information which represents that a DM server device has authority to make an addition command to add a recipient node to the Trap MO;
storing the Trap MO and a plurality of MOs including a notification target MO in a memory;
receiving the addition command from the DM server device;
determining, by a processor, if the DM server device has authority to make the addition command by checking the authority information of the Trap MO via a lookup on a list; determining if the DM server device has authority to make an execution command by checking, via the lookup on the list, the notification target MO requested to be registered; and
registering the notification target MO as a recipient node in the Trap MO when the DM server device has authority to make the addition command and the execution command.

3. The method of claim 2, further comprising:
transmitting a registration error message to the DM server device when the DM server device does not have authority to make the addition command.

4. The method of claim 2, further comprising:
transmitting a registration error message to the DM server device when the DM server device does not have authority to make the execution command.

5. The method of claim 2, further comprising a step of transmitting a registration confirmation message to the DM server device when the DM client device registers the recipient node in the Trap MO.

6. The DM client device of claim 1, wherein the DM message transmission/reception block transmits a registration error message to the DM server device when the DM server device does not have authority to make the addition command.

7. The DM client device of claim 1, wherein the DM message transmission/reception block transmits a registration error message to the DM server device, when the DM server device does not have authority to make the execution command.

8. The DM client device of claim 1, wherein the DM message transmission/reception block transmits a registration confirmation message to the DM server device, when the DM client device registers the recipient node in the Trap MO.

9. A Device Management (DM) server device comprising:
a computer processor;
a memory for storing processor-executable instructions which, when executed by the computer processor, implement a DM message transmission/reception block, a Management Object (MO) storage block and a security management block;
the DM message transmission/reception block for transmitting to a DM client device a DM message having a Trap Management Object (Trap MO) including authority information which represents that a DM server device has authority to make an addition command to add a recipient node to the Trap MO so that the DM client device determines, when receiving the addition command, whether the DM server device has authority to make the addition command by checking the authority information of the Trap MO via a lookup on a list, receiving the DM message, and receiving a registration confirmation message from the DM client device in response to the DM message; and
the MO storage block for storing the Trap MO and a plurality of MOs which include a notification target MO.

10. The DM server device of claim 9, wherein the DM message transmission/reception block receives a registration error message from the DM client device when the DM server device does not have authority to make the addition command.

11. The DM server device of claim 9, wherein the DM message transmission/reception block receives a registration error message from the DM client device when the DM server device does not have authority to make the execution command.

12. The DM server device of claim 9, wherein the DM message transmission/reception block receives a registration confirmation message from the DM client device when the DM client device registers the recipient node in the Trap MO.

13. A method for Device Management (DM) security of a Trap Management Object (Trap MO) in DM server device, the method comprising:
transmitting to a DM client device a DM message having a Trap MO including authority information which represents that the DM server device has authority to make an addition command to add a recipient node to the Trap MO to a DM client device so that the DM client determines, when receiving the addition command, whether the DM server device has authority to make the addition command by checking the authority information of the Trap MO via a lookup on a list;
storing, in a memory, the Trap MO and a plurality of Management Objects (MOs) which include a notification target MO;
transmitting the addition command to register, by a processor, information of the notification target MO; and
receiving a registration confirmation message from the DM client device in response to the DM message, wherein the DM server device has authority to make the addition command and to make an execution command.

14. The method of claim 13, further comprising: receiving a registration error message from the DM client device when the DM server device does not have authority to make the addition command.

15. The method of claim 13, further comprising:
receiving a registration error message from the DM client device when the DM server device does not have authority to make the execution command.

16. The method of claim 13, further comprising:
receiving a registration confirmation message from DM client device when the DM client device registers the recipient node in the Trap MO.

17. The method of claim 2, further comprising:
storing the authority information in a "ToRef" recipient node; and
storing the execution authority information in a scheduling recipient node,
wherein the scheduling recipient node includes a condition node and a task node, and
wherein the scheduling recipient node is included in the "ToRef" node.

* * * * *